United States Patent [19]

Bytzek

[11] Patent Number: 4,816,012

[45] Date of Patent: Mar. 28, 1989

[54] TENSIONER WITH INCREASED ARCUATE MOVEMENT

[75] Inventor: Klaus K. Bytzek, Schomberg, Canada

[73] Assignee: Litens Automotive Partnership, Woodbridge, Canada

[21] Appl. No.: 94,864

[22] Filed: Sep. 10, 1987

[51] Int. Cl.[4] ............................................. F16H 7/08
[52] U.S. Cl. .................................... 474/135; 474/112
[58] Field of Search ............... 474/135, 133, 111, 109, 474/112, 101

[56] References Cited

U.S. PATENT DOCUMENTS

| | | | |
|---|---|---|---|
| 4,077,272 | 3/1978 | Busso | 474/110 |
| 4,473,362 | 9/1984 | Thomey et al. | 474/133 X |
| 4,504,252 | 3/1985 | Honma | 474/135 X |
| 4,551,120 | 12/1985 | Thomey | 474/135 |
| 4,557,707 | 12/1985 | Thomey | 474/135 X |
| 4,634,407 | 1/1987 | Holtz | 474/112 |

*Primary Examiner*—Thuy M. Bui

*Attorney, Agent, or Firm*—Cushman, Darby & Cushman

[57] ABSTRACT

A belt tensioner comprising a pivoted structure carrying a pulley for rotation about a rotational axis and mounted on a fixed structure for pivotal movement between an increased range of angular movement. The pulley is operatively positioned with respect to its rotational axis and the pivotal axis of the pivoted structure such that the lever arm to the pivotal axis through which the generally constant belt load force acts on the pivoted structure increases at a decreasing rate and then decreases at an increasing rate throughout the range of movement of the pulley between its first and second positions in a direction toward the second position. The spring assembly is operatively associated with the pivoted structure so as to apply a spring torque to the pivoted structure which increases at a decreasing rate and then decreases at an increasing rate throughout the range of movement of the pulley between its first and second positions in a direction toward said second position.

24 Claims, 2 Drawing Sheets

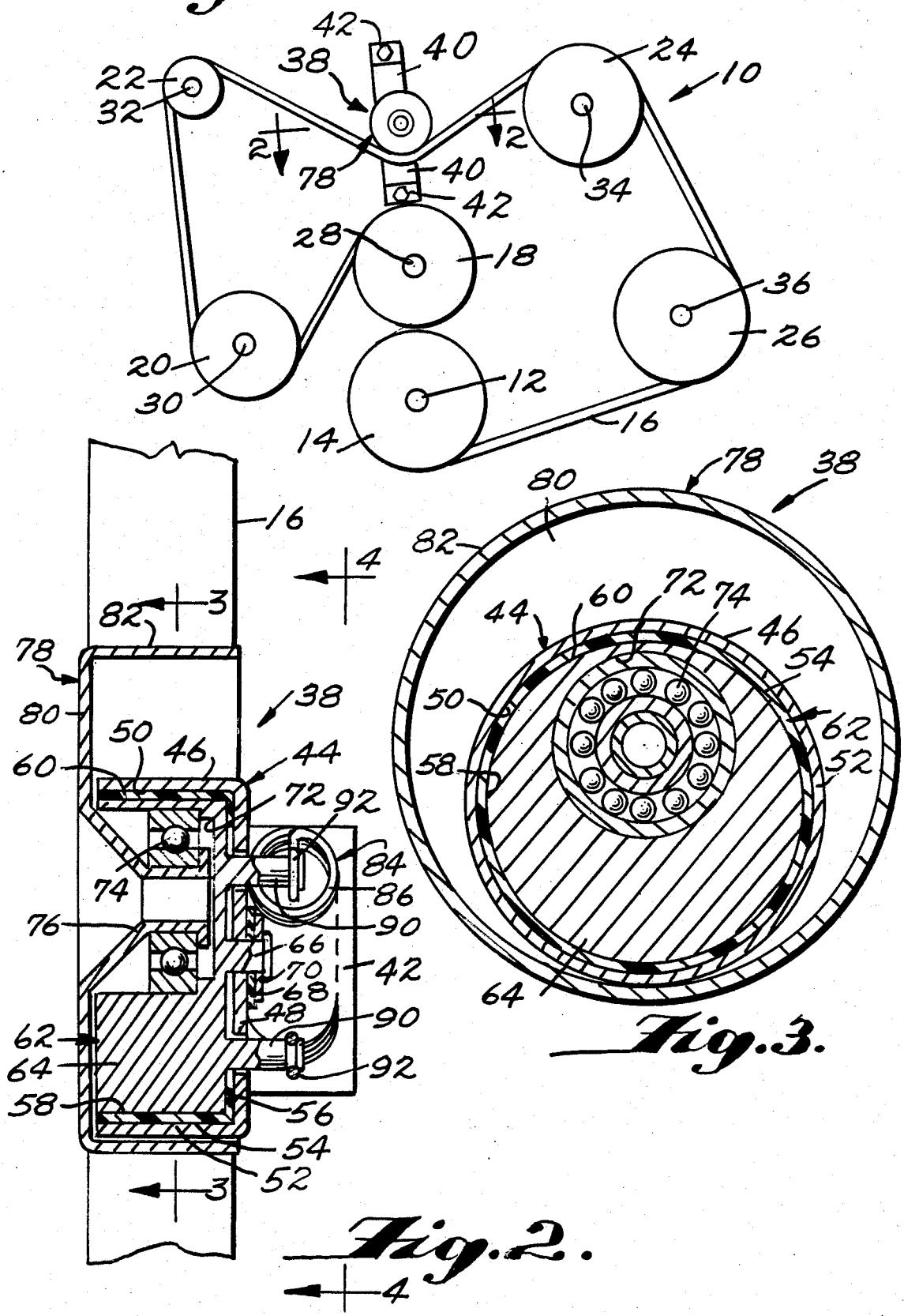

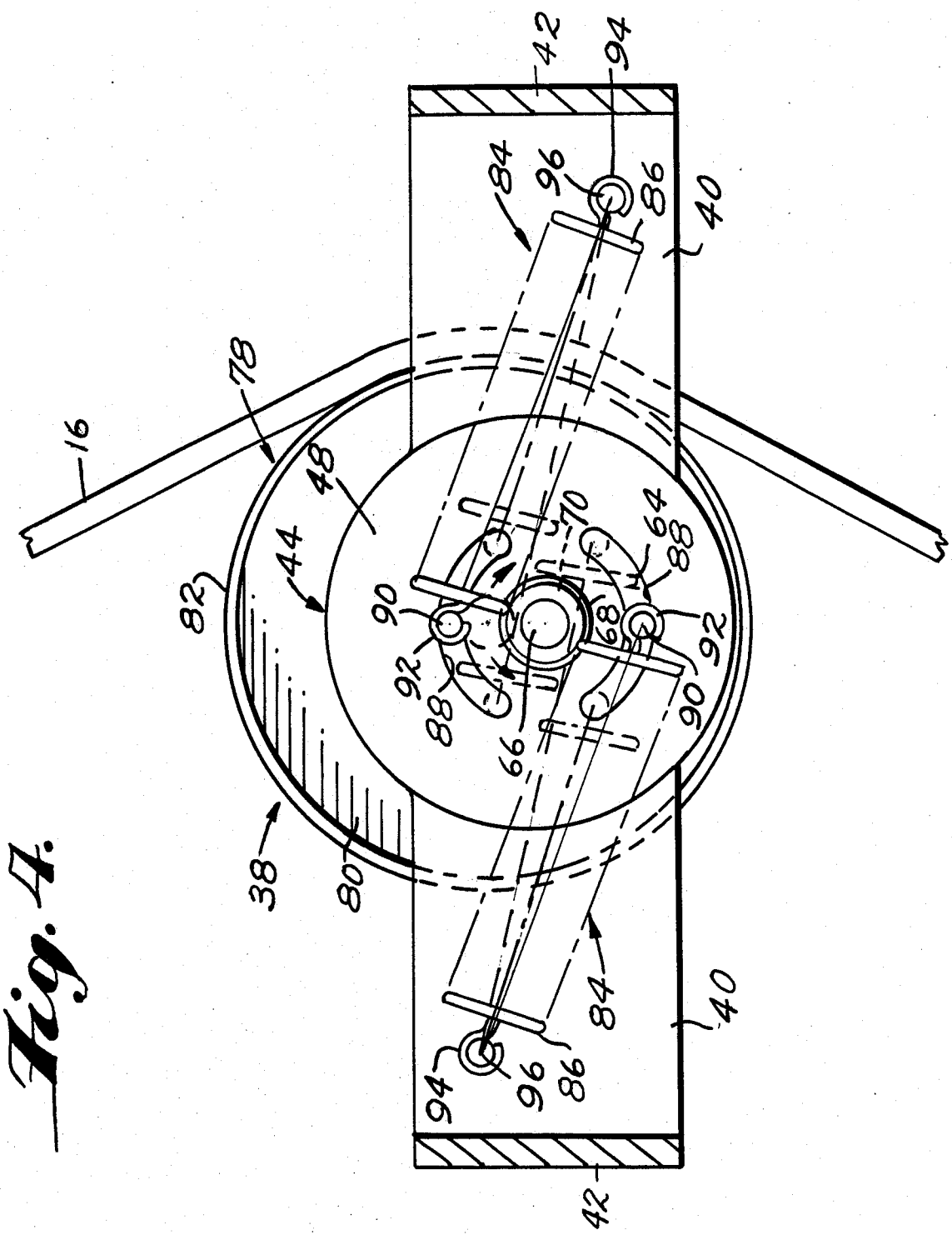

TENSIONER WITH INCREASED ARCUATE MOVEMENT

This invention relates to belt tensioners and more particularly to belt tensioners of the type used in automotive engine serpentine belt systems and timing belt systems.

BACKGROUND OF THE INVENTION

A typical belt tensioner includes a fixed structure, a pivoted structure mounted on the fixed structure by a pivot bearing for pivotal movement about a pivotal axis and a belt tensioning pulley mounted on the pivoted structure by a rotational bearing for rotational movement about a rotational axis parallel with the pivotal axis. A torsion spring is provided for resiliently biasing the pivoted structure to pivot from a first limiting position corresponding to a loosened belt mounting position toward a second position during which the belt is engaged and tensioned. The torsion spring applies a torque to the pivoted structure which when the belt is tensioned is equal and opposite to a belt load torque. The spring torque decreases as the pivoted structure moves from its first position toward its second position and so does the belt load torque. While the belt load torque decreases over the range of movement provided, it is desirable that the belt load force and hence the belt tension be maintained relatively constant throughout the range of movement provided. The pulley is positioned with respect to the belt such that the lever arm through which the belt load force acts decreases as the pivoted structure moves from the first position to the second position so as to maintain the static belt load force substantially constant. In this way, the belt tensioner operates to maintain a constant static belt tension throughout a range of movement capable of accomodating belt wear and extension.

When the belt is moved, the dynamic belt load force acting on the tensioning pulley varies from the static load force resulting in movements away from the static equilibrium position which are either resisted by or effected by the torque applied by the spring. If this resilient movement is allowed to take place without damping control, a resonant vibratory movement of the pulley can ensue with disastrous results.

In commonly assigned copending application, Ser. No. 090,495, filed Aug. 28, 1987, there is disclosed a releasable belt load damping arrangement which minimizes the pivotal movements requiring damping. The arrangement provides a damping torque resistance to pivotal movements which is established by virtue of the engagement of a bearing surface of the sleeve pivot bearing and a bearing surface of either the fixed structure or pivoted structure slidable with respect thereto. The surfaces are pressed together by the belt load force of the pivoted member and a reactionary force of the fixed structure. The magnitude of the damping torque resistance is a function of the magnitude of the belt load and reactionary forces, the coefficient of friction of the materials defining the surfaces and the radial distance from the pivotal axis to the surfaces. In order to establish a damping torque resistance of sufficient magnitude, the last variable is, in accordance with the principles enunciated in the application, increased significantly, preferably to the point that the sleeve bearing is of a size to encircle the rotational bearing. This relationship enabled the two bearings to be brought into axial coextensive relation with the belt engaging exterior periphery or rim portion of the pulley so as to insure that the belt load force is transmitted to the pivot bearing in an axially balanced fashion thus achieving uniform wearing characteristics and hence longer bearing life.

As previously indicated, the nature of the counterbalancing spring torque and belt load torque is such that there is a limit to the angular extent of pivotal movement which the pivoted structure can have and still maintain a generally constant belt load force throughout the range of pulley movement provided. This range of angular movement is approximately 70°. Consequently, the amount of pulley movement provided is a direct function of the distance between the pulley rotational axis and the pivotal axis of the pivoted structure. In the axially aligned and balanced arrangement such as disclosed in the aforesaid application, this distance must necessarily be less than the radius of the pulley; consequently, as pulley movement range is increased, pulley size must likewise increase. There are other known types of axially aligned and balanced belt tensioners which suffer from the same limitations. See, for example, U.S. Pat. Nos. 4,077,272, 4,504,252, 4,551,120, and 4,634,407. Because of these limitations, there is a need to provide for a greater range of pulley movement without sacrificing the ability to maintain a generally constant static belt load force throughout the range of movement provided.

SUMMARY OF THE INVENTION

It is an object of the present invention to fulfill the need described above. In accordance with the principles of the present invention, this objective is obtained by providing for an increased range of angular movement of the pivoted structure of the belt tensioner with respect to the fixed structure of the belt tensioner. The pulley of the belt tensioner is operatively positioned with respect to its rotational axis and the pivotal axis of the pivoted structure such that the lever arm to the pivotal axis through which the generally constant belt load force acts on the pivoted structure increases at a decreasing rate and then decreases at an increasing rate throughout the range of movement of the pulley between its first and second positions in a direction toward the second position. The spring assembly is operatively associated with the pivoted structure so as to apply a spring torque to the pivoted structure which increases at a decreasing rate and then decreases at an increasing rate throughout the range of movement of the pulley between its first and second positions in a direction toward said second position. In this way up to as much as 140° of angular movement is accommodated while still retaining a generally constant static belt load force.

Another object of the present invention is the provision of a belt tensioner of the type described which is simple in construction, effective in operation and economical to manufacture.

These and other objects of the present invention will become more apparent during the course of the following detailed description and appended claims.

The invention may best be understood with reference to the accompanying drawings wherein illustrative embodiments are shown.

BRIEF DESCRIPTION OF THE DRAWINGS

IN THE DRAWINGS:

FIG. 1 is a schematic view of an automotive internal combustion engine serpentine belt system including a belt tensioner embodying the principles of the present invention;

FIG. 2 is an enlarged fragmentary sectional view taken along the line 2—2 of FIG. 1;

FIG. 3 is a sectional view taken along the line 3—3 of FIG. 2; and

FIG. 4 is a sectional view taken along the line 4—4 of FIG. 2.

DESCRIPTION OF THE PREFERRED EMBODIMENT

Referring now more particularly to the drawings, there is shown schematically in FIG. 1 an automotive internal combustion engine serpentine belt system, generally indicated at 10, which includes an engine output shaft 12 having a drive pulley 14 fixed thereon around which is trained an endless belt 16. The belt 16 is of the thin flexible type, as, for example, a poly-V belt. The belt 16 in additional to being trained about the drive pulley 14 is also trained about a plurality of further pulleys 18, 20, 22, 24, and 26 each of which is fixed to respective shafts 28, 30, 32, 34, and 36. The shafts are connected to operate various engine accessories. For example, shaft 28 drives a power steering device, shaft 30 an engine water pump, shaft 32 an air pump of the type used in an anti-pollution system for the engine, shaft 34 an engine electrical alternator, and shaft 36 a compressor of an air conditioning system for the automoble utilizing the engine.

The belt 16 is tensioned by a belt tensioner, generally indicated at 38, which embodies the principles of the present invention. The belt tensioner 38 is mounted on the frame of the internal combustion engine providing output shaft 12 by a fixed mount in the form of a pair of plates 40 having L-shaped mounting legs 42 on the outer ends thereof. The inner ends of the plates 40 are welded or otherwise suitably fixed to a fixed structure, generally indicated at 44, forming a part of the belt tensioner 38. As best shown in FIG. 2, the fixed structure 44 is in the form of an annular member including a cylindrical wall portion 46, to one end of which the adjacent ends of the plates 40 are welded. Extending radially inwardly of the same one end of the cylindrical wall portion 46 is a radial wall portion 48. The cylindrical wall portion 46 includes an interior cylindrical bearing surface 50 disposed in engagement with an exterior peripheral bearing surface 52 of a sleeve bearing 54.

As shown, the sleeve bearing 54 includes a radially inwardly extending flange 56 which engages the adjacent surface of the radial wall portion 48 of the fixed structure 44. The sleeve bearing 54 also includes an interior peripheral bearing surface 58 which engages an exterior cylindrical bearing surface 60 of a pivoted structure, generally indicated at 62. While it is preferred that the surfaces 60 and 58 be slidable and the surfaces 50 and 52 fixed, it will be understood that the slidable and fixed relationship can be reversed or both could be made slidable.

The pivoted structure 62 generally consists of an annular member 64 having a central stem 66 extending rearwardly from one end thereof. The stem 66 extends through a suitable central opening in the radial wall portion 48 of the fixed structure 44 and receives thereon an annular washer 68 of flexible material, as, for example, Zytel or the like. The annular washer 68 is, in turn, engaged by a rigid washer 70 which is held in position by enlarging the end of the stem 66. The annular washer 68 serves to maintain the axial alignment of the pivoted structure 62 with the fixed structure 44 in a forward direction, whereas the flange 56 of the sleeve bearing 54 maintains axial alignment in the opposite direction. It can be seen that by virtue of the sliding pivotal movement of the exterior peripheral bearing surface 60 of the pivoted structure 62 with the interior peripheral bearing surface 58 of the sleeve bearing 62, the pivoted structure 62 is confined to pivot with respect to the fixed structure 44 about a pivotal axis which is coincident with the axis of the stem 66.

Formed in the forward portion of the pivoted structure 62 in radially offset relation with respect to the pivotal axis is a stepped cylindrical recess 72 within which is mounted a ball bearing assembly 74. The ball bearing assembly 84 serves to rotatably mount a hollow hub portion 76 of a belt tightening pulley, generally indicated at 78, for rotational movement about a rotational axis which is disposed in parallel relation with the pivotal axis. As best shown in FIG. 2, the hollow hub portion 76 of the pulley 78 is flanged at one end and flares outwardly at its other end. The flared end merges with a circular wall 80 which is disposed forwardly adjacent the forward end of the pivoted structure 62 and the cylindrical wall portion 46 of the fixed structure 44. Extending axially rearwardly in cantilever fashion from the outer periphery of the circular radial wall 80 of the pulley 78 is an annular wall or rim portion 82 which serves to engage the belt 16 in the serpentine belt system 10. It will be noted that the rim portion 82 of the pulley 78 is disposed in axially coextensive and annularly surrounding relation with respect to the cylindrical wall portion 46 of the fixed structure 44 and the sleeve bearing 54 which, in turn, is disposed in axially coextensive and annularly surrounding relation with respect to the ball bearing assembly 74 and the rotational axis defined thereby.

As best shown in FIG. 1, the belt tensioner 38 is mounted on the engine frame so that the pulley can be manually moved into a first position wherein the rim portion 82 of the pulley can be transversely aligned with the belt 16 disposed in loosely trained relation about the pulleys 14, 18, 20, 22, 24 and 26. In accordance with the principles of the present invention, the pulley 78 is capable of movement through an increased range of operative positions of engagement with the belt 16, the outer limit of which is defined by a second limiting position, which preferably is disposed 140° from the first position.

In accordance with the principles of the present invention, spring means, generally indicated at 84, is provided for applying a spring torque to the pivoted structure acting in a direction to move the pulley 78 toward its second position so that when the pulley is manually released from its first position in axial alignment with the loosely trained belt 16, the pulley will be moved by the spring torque into a belt tensioning static equilibrium position intermediate the first and second positions wherein a belt load torque which is equal and opposite to the spring torque is established. The spring torque varies as the intermediate operating position approaches the second position due to belt elongation so that the belt load torque will likewise vary as the spring torque varies. The arrangement is such that even though the belt load torque varies, the belt load force is maintained generally constant throughout the range of operative positions of the pulley 78 so that the belt is maintained with a generally constant static tension.

It will be understood that when the belt 16 is moved as by the operation of the internal combustion engine and the rotation of the output shaft 12 and pulley 14, the static belt load force will change due to the dynamics of the serpentine belt system 10. Where the dynamic changes are such as to increase the static belt load force, the pulley 78 tends to move in a direction toward its first position by virtue of the increased belt load torque and against the bias of the spring torque. Where the dynamic changes are such as to decrease the static belt load force, the pulley tends to move in a direction toward its second position by the spring torque. The belt tensioner 38 may be provided with any means for controlling these movements so as to prevent the establishment of dangerous resonant movements during operation. The exemplary damping arrangement shown is in accordance with the teachings of the aforesaid copending application, Ser. No. 090,495, filed Aug. 28, 1987, the disclosure of which is hereby incorporated by reference into the present specification. A detailed disclosure of the operation of the damping arrangement is not believed necessary to an understanding of the present invention. Briefly, it will be understood that a damping torque resistance to pulley movement is established by the interengagement of the surfaces 58 and 60 which prevents movement within a range above −50% of the static belt load force, the vibratory forces due to the operation of the internal combustion engine serving to instantaneously release the damping torque resistance so as to permit instantaneous movements which would otherwise be prevented.

The preferred form of the spring means 84 shown is structured to accommodate the releasable belt load damping arrangement by applying the spring torque to the pivoted structure 62 in a radially balanced fashion so that there are no side loads imposed on the sleeve bearing 54. This radial balance is obtained by utilizing two symmetrically arranged tensile coil springs 86. It will be understood that while this balanced two spring arrangement is preferred, it is within the contemplation of the present invention to utilize a single spring.

As best shown in FIGS. 2 and 4, the radial wall portion 48 of the fixed structure 44 is formed with a pair of diametrically opposed slots 88 which are arcuate about the pivotal axis of the pivoted structure 62. Formed on the pivoted member 64 and extending rearwardly therefrom through the slots 88 is a pair of studs or pin portions 90. The axes of the studs 90 lie in a common plane which also passes through the pivotal axis and the rotational axis. The arcuate extent of the slots 88 are such that the studs 90 engage one of the ends when the pulley 78 is in its first position and the other of the ends when the pulley 78 is in its second position. The total movement of the studs 90 within the slots 88 is preferably approximately 140°.

As best shown in FIG. 4, each coil spring 86 has one end 94 fixed to an associated stud 90. Each coil spring 86 has an opposite end 94 which is secured to a second stud 96 fixed to an associated plate 40. Plates 40 may be considered part of the fixed structure 44 of the belt tensioner 38 since they are both rigidly fixed to the cylindrical wall portion 46 thereof. Studs 96 are parallel with the central stud 66 of the pivoted member 64 and are disposed equidistantly in diametrically opposed relation thereto and to the pivotal axis of the pivoted member which is coincident therewith.

The manner in which the spring torque varies within the range of movement provided can best be understood with reference to a pair of reference planes passing through the ends 92 and 94 of the springs 86 respectively or more precisely the axes of the pairs of studs 90 and 96 respectively. These reference planes define the directions the spring forces of the springs 86 act on the pivoted structure 62 and the perpendicular distances from the reference planes to the pivotal axis define the lever arms through which the spring forces act. It will be evident that the spring forces of the springs 86 will progressively decrease as the pivoted structure moves from its first position (shown in dotted lines in FIG. 4) into its second position (shown in phantom lines in FIG. 4). It will be noted that the lever arms are the smallest when the spring forces are the largest; namely, when the pivoted structure is in its first position. As the pivoted structure moves away from the first position, the lever arms increase but at a decreasing rate until they reach their maximum lengths at a position between the midposition shown in solid lines in FIG. 4 and the second position. Thereafter, as the pivoted structure moves toward its second position, the lever arms decrease at an increasing rate. The torque variation is the product of the progressively decreasing spring forces and the variation in the lever arms which initially increase at a decreasing rate and then decrease at an increasing rate, ending at a length which is greater than the initial length. The spring torque variation from the first position to the second position generally follows the lever arm variation but with a displacement of the transition position generally to the midposition shown in FIG. 4.

The static belt load torque is determined by the spring torque and hence varies therewith. The belt load torque can best be understood with reference to a plane passing through the pivotal axis at a position equidistantly between adjacent ends of the slots 88. The direction of this plane generally defines the direction of the belt load force which is along a radius to the rotational axis which besects the angle of wrap of the belt. The lever arm through which the belt load force acts is the perpendicular distance from this plane to the rotational axis. It can be seen from FIG. 4, that the belt load force lever arm varies almost exactly as the spring torque varies so that since the belt load torque must similarly vary, the static belt load force remains constant throughout the increased range of movement provided. As indicated, the conventional angular movement of 70° is doubled (to 140°) thus enabling the parts of the belt tensioner to remain within desirable size limits.

It thus will be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. In a belt tensioner comprising a fixed structure, a pivoted structure, a belt tensioning pulley mounted on said pivoted structure for rotational movement about a rotational axis, said pivoted structure being mounted on said fixed structure for pivotal movement about a fixed pivotal axis parallel with said rotational axis between a first position wherein said belt tensioning pulley can be transversely aligned with a loosely trained belt and a second position, and spring means for resiliently biasing said pivoted structure in a direction toward said second position permitting manual movement of said belt tensioning pulley into said first position against such resilient bias so that upon manual release the resilient bias moves said belt tensioning pulley into an intermediate operating static equilibrium position wherein the spring torque is equal and opposite to a belt load torque which varies with the variation in the spring torque as the intermediate operation position approaches said second position due to belt elongation by maintaining the belt load force generally constant and varying a lever arm distance to said pivotal axis through which the belt load force acts, an improvement which enables said pulley to be operatively positioned with respect to said rotational axis and said pivotal axis so as to provide an increased operative range of positions between said first and second positions wherein said intermediate operating static equilibrium position occurs, said improvement comprising:

said pulley being operatively positioned with respect to said rotational axis and said pivotal axis such that the lever arm distance to said pivotal axis through which said generally constant belt load force acts on said pivoted structure increases at a decreasing rate and then decreases at an increasing rate throughout said operative range of positions in a direction toward said second position, said spring means being operatively associated with said pivoted structure so as to apply a spring torque to said pivoted structure which increases at a decreasing rate and then decreases at an increasing rate throughout said operative range of positions in a direction toward said second position.

2. The improvement as defined in claim 1 wherein said spring means is mounted between said fixed and pivoted structures in such a way that the spring force decreases throughout the operative range of positions in a direction toward said second position while the lever arm distance to said pivotal axis through which said spring force acts on said pivoted structure increases at a decreasing rate and then decreases at an increasing rate.

3. The improvement as defined in claim 2 wherein said spring means includes a pair of tension springs having first ends fixed to said fixed structure at diametrically opposed positions with respect to said pivotal axis and second ends fixed to said pivoted structure at diametrically opposed positions with respect to said pivotal axis.

4. The improvement as defined in claim 3 wherein the second ends of said tension springs are disposed within a common plane which also passes through said pivotal axis and said rotational axis, said common plane being perpendicular to the direction of the belt load force when said pulley is in a midway operation position.

5. The improvement as defined in claim 4 wherein said rotational axis is disposed within said common plane at a position between said pivotal axis and one of said second ends.

6. The improvement as defined in claim 5 wherein the first ends of said tension coil springs are located such that a pair of reference planes passing through the first and second ends of said pair of springs respectively are spaced equidistantly a maximum perpendicular distance from the pivotal axis when said pulley is in an intermediate operating position between said midway position and said second position.

7. The improvement as defined in claim 6 wherein the pivotal movement of said pivoted structure between said first position and said second position is approximately 140°.

8. The improvement as defined in claim 3 wherein said fixed structure includes a cylindrical wall portion having an end wall portion extending radially inwardly from one end thereof, said cylindrical wall portion having an interior cylindrical bearing surface, said pivoted structure including a pivoted member having an exterior cylindrical bearing surface, and a sleeve bearing between said interior and exterior cylindrical bearing surfaces defining said pivotal axis.

9. The improvement as defined in claim 8 wherein said end wall portion is formed with a pair of arcuate slots in diametrically opposed relation to said pivotal axis, said pivoted member having a pair of studs extending through said arcuate slots to which the second ends of said tension springs are connected.

10. The improvement as defined in claim 1 wherein the pivotal movement of said pivoted structure between said first position and said second position is approximately 140°.

11. In a belt tensioner comprising a fixed structure, a pivoted structure, a belt tensioning pulley, rotational bearing means mounting said belt tensioning pulley on said pivoted structure for rotational movement about a rotational axis, pivotal bearing means mounting said pivoted structure on said fixed structure for pivotal movement about a fixed pivotal axis parallel with said rotational axis between a first position wherein said belt tensioning pulley can be transversely aligned with a loosely trained belt and a second position, and spring means for resiliently biasing said pivoted structure in a direction toward said second position permitting manual movement of said belt tensioning pulley into said first position against such resilient bias so that upon manual release the resilient bias moves said belt tensioning pulley into an intermediate operating static equilibrium position wherein the spring torque is equal and opposite to a belt load torque which varies with the variation in the spring torque as the intermediate operation position approaches said second position due to belt elongation by maintaining the belt load force generally constant and varying a lever arm distance to said pivotal axis through which the belt load force acts, said pulley having a belt engaging rim portion disposed in axially coextensive and annularly surrounding relation to (1) said rotational bearing means and (2) to said pivotal bearing means so that the belt load force acting on the pulley rim portion is transmitted to the pivotal bearing means in axially balanced fashion, an improvement which enables said pulley to be operatively positioned with respect to said rotational axis and said pivotal axis so as to provide an increased operative range of positions between said first and second positions wherein said intermediate operating static equilibrium position occurs, said improvement comprising:

said pulley being operatively positioned with respect to said rotational axis and said pivotal axis such that the lever arm distance to said pivotal axis through which said generally constant belt load force acts on said pivoted structure increases at a decreasing rate and then decreases at an increasing rate throughout said operative range of positions in a direction toward said second position, said spring means being operatively associated with said pivoted structure so as to apply a spring torque to said pivoted structure which increases at a decreasing rate and then decreases at an increasing rate throughout said operative range in a direction toward said second position.

12. The improvement as defined in claim 11 wherein said spring means is mounted between said fixed and pivoted structures in such a way that the spring force decreases throughout the operative range of positions in a direction toward said second position while the lever arm distance to said pivotal axis through which said spring force acts on said pivoted structure increases at a decreasing rate and then decreases at an increasing rate.

13. The improvement as defined in claim 12 wherein said spring means includes a pair of tension springs having first ends fixed to said fixed structure at diametrically opposed positions with respect to said pivotal axis and second ends fixed to said pivoted structure at diametrically opposed positions with respect to said pivotal axis.

14. The improvement as defined in claim 13 wherein the second ends of said tension springs are disposed within a common plane which also passes through said pivotal axis and said rotational axis, said common plane being perpendicular to the direction of the belt load force when said pulley is in a midway operation position.

15. The improvement as defined in claim 14 wherein said rotational axis is disposed within said common plane at a position between said pivotal axis and one of said second ends.

16. The improvement as defined in claim 15 wherein the first ends of said tension coil springs are located such that a pair of reference planes passing through the first and second ends of said pair of springs respectively are spaced equidistantly a maximum perpendicular distance from the pivotal axis when said pulley is in an intermediate operating position between said midway position and said second position.

17. The improvement as defined in claim 16 wherein the pivotal movement of said pivoted structure between said first position and said second position is approximately 140°.

18. The improvement as defined in claim 17 wherein said pivotal bearing means comprises a sleeve bearing disposed in surrounding relation with respect to said rotational bearing means.

19. The improvement as defined in claim 18 wherein said sleeve bearing includes a bearing surface in slidable engagement with a bearing surface on one of said structures, said bearing surfaces being compressed into interengagement by the belt load force in said pivoted structure and a reactionary force in said fixed structure so as to establish a damping torque resistance to the pivotal movements of said pivoted structure.

20. The improvement as defined in claim 19 wherein the coefficient of friction of the materials forming said bearing surfaces and the distance of said surfaces from said pivotal axis are such as to establish with said belt load and reactionary forces a damping torque resistance capable of (1) preventing pivotal movements within a range of dynamic changes in the static belt load force above $-50\%$ and (2) being instantaneously released in response to vibrational forces independent of the belt load forces so as to instantaneously permit movements otherwise prevented.

21. The improvement as defined in claim 11 wherein the pivotal movement of said pivoted structure between said first position and said second position is approximately 140°.

22. The improvement as defined in claim 11 wherein said pivotal bearing means comprises a sleeve bearing disposed in surrounding relation with respect to said rotational bearing means.

23. The improvement as defined in claim 22 wherein said sleeve bearing includes a bearing surface in slidable engagement with a bearing surface on one of said structures, said bearing surfaces being compressed into interengagement by the belt load force in said pivoted structure and a reactionary force in said fixed structure so as to establish a damping torque resistance to the pivotal movements of said pivoted structure.

24. The improvement as defined in claim 23 wherein the coefficient of friction of the materials forming said bearing surfaces and the distance of said surfaces from said pivotal axis are such as to establish with said belt load and reactionary forces a damping torque resistance capable of (1) preventing pivotal movements within a range of dynamic changes in the static belt load force above $-50\%$ and (2) being instantaneously released in response to vibrational forces independent of the belt load forces so as to instantaneously permit movements otherwise prevented.

* * * * *